United States Patent
Yeung et al.

(10) Patent No.: US 7,800,266 B2
(45) Date of Patent: Sep. 21, 2010

(54) ELECTRIC MOTOR

(75) Inventors: Yuk Wai Elton Yeung, Hong Kong (CN); Kam Wing Poon, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/121,112

(22) Filed: May 15, 2008

(65) Prior Publication Data

US 2008/0284266 A1     Nov. 20, 2008

(30) Foreign Application Priority Data

May 17, 2007     (GB) ................... 0709455.0

(51) Int. Cl.
    *H02K 5/16*     (2006.01)
(52) U.S. Cl. ...................................... 310/90
(58) Field of Classification Search .................. 310/90
    See application file for complete search history.

(56) References Cited

U.S. PATENT DOCUMENTS

| | | | |
|---|---|---|---|
| 2,483,013 A | 9/1949 | Kopprasch | |
| 4,209,722 A | 6/1980 | Peachee | |
| 4,711,590 A * | 12/1987 | Lakin | 384/206 |
| 4,820,948 A * | 4/1989 | Rogelein | 310/90 |
| 6,008,557 A * | 12/1999 | Dornhoefer et al. | 310/90 |
| 6,707,177 B1 | 3/2004 | Campbell et al. | |
| 2006/0274984 A1* | 12/2006 | Gutowski et al. | 384/486 |

FOREIGN PATENT DOCUMENTS

| | | |
|---|---|---|
| GB | 777490 | 6/1957 |
| GB | 2 192 312 A | 1/1988 |
| JP | 2007 110795 A | 4/2007 |
| WO | WO-03079518 | 9/2003 |

* cited by examiner

*Primary Examiner*—Quyen Leung
*Assistant Examiner*—Leda Pham
(74) *Attorney, Agent, or Firm*—Muncy, Geissler, Olds & Lowe, PLLC

(57) ABSTRACT

An electric motor has a wound rotor having a shaft, a rotor core, a commutator and windings wound about the rotor core and connected to the commutator. It has a stator confronting the rotor; brush gear connecting the commutator to motor terminals; first and second bearings for rotatably supporting the rotor, and an oil stopper fitted to the shaft between the commutator and the first bearing for preventing oil migrating along the shaft from the first bearing reaching the commutator. The oil stopper is of high temperature material, preferably a metal such as brass, aluminum and steel.

8 Claims, 6 Drawing Sheets

ELECTRIC MOTOR

CROSS REFERENCE TO RELATED APPLICATIONS

This non-provisional patent application claims priority under 35USC §119(a) from Patent Application No. 0709455.0 filed on May 17, 2007.

BACKGROUND OF THE INVENTION

This invention relates to an electric motor with a commutator and in particular to an oil migration barrier for such a motor.

In small, fractional and subfractional horsepower, permanent magnet direct current motors, brush gear and a commutator are typically used to transfer electrical power from motor terminals to rotor windings. The commutator, which consists of copper segments laid on a commutator base, is located adjacent one of the bearings rotationally supporting the rotor. Such bearings are typically oil impregnated sintered bushings due to wear and cost considerations. One disadvantage of these bearings is that the oil is not sealed within the bushing and tends to migrate along the shaft. Such migration if not checked, can extend to the commutator segments where the oil contaminates the brush/segment interface and mixes with brush dust ultimately rendering the motor inoperable by short circuiting commutator segments. Oil migration is also a problem for ball and roller bearings, albeit not as great, especially in high temperature applications such as within the engine compartment of a vehicle.

GB2192312 addresses this problem by providing a rubber oil collector disc which traps the oil. However, being rubber, care and space is required to prevent the disc from coming into direct contact with the bearing. Also, the motor is not suitable for use in very high temperature applications.

GB2207956 discloses a thin disc which is pressed onto the shaft so as to form a dish shape. This has the advantage of being very thin and thus, does not occupy significant shaft space but to work effectively, the motor must be rotating at a sufficient speed and for a sufficient period of time to fling any trapped oil from the surface of the disc, otherwise the oil migration is only delayed but not stopped. Also, effective sealing between the shaft and the disc is difficult to obtain and care is needed to ensure that the disc does not contact the bearing otherwise it may invert.

In both of these cases, separate spacers, which limit axial movement of the rotor through the bushings are required as well as axial space or shaft space for the oil stopper. Hence, as devices being driven by the motor are becoming smaller and lighter, smaller and lighter motors are desired. In some applications, the motor is operated under very low speed or very low angular distances and thus, do not generate the right conditions for an oil slinger to operate correctly/effectively.

Hence, there is a desire or need for a oil stopper which can withstand high temperatures and there is a further desire for an oil stopper which can withstand high temperatures and accept a degree of axial loading so as to provide a thrust surface for the brushing.

SUMMARY OF THE INVENTION

Accordingly, the present invention provides an electric motor comprising: a wound rotor having a shaft, a rotor core, a commutator and windings wound about the rotor core and connected to the commutator; a stator confronting the rotor; brush gear connecting the commutator to motor terminals; first and second bearings for rotatably supporting the rotor, and; an oil stopper fitted to the shaft between the commutator and the first bearing for preventing oil migrating along the shaft from the first bearing reaching the commutator; wherein the oil stopper is of high temperature material.

Preferably, the oil stopper is of metal, optionally brass, aluminum or steel.

Preferably, the oil stopper has a body portion for fixedly mounting to the shaft and an oil collecting portion.

Preferably, the oil stopper is fixed to the shaft by an oil tight press fit.

Preferably, the body portion of the oil stopper is adapted to make direct contact with an axial face of the first bearing.

Preferably, the body portion of the oil stopper is adapted to function as a spacer and is fixed fast to the shaft to limit movement of the shaft through the first bearing in a first direction.

Preferably, the oil collecting portion of the oil stopper extends radially outwardly from the body portion and has an annular cavity with an opening facing towards the first bearing.

Preferably, the opening is spaced from the shaft and the diameter of the outer edge of the opening is greater than the diameter of the bearing.

Preferably, the annular cavity has a radially inwardly extending lip on the radially outer edge of the opening.

Preferably, the inner diameter of the lip is greater than a diameter of the bearing.

Preferably, the first bearing is an oil impregnated sintered bushing.

BRIEF DESCRIPTION OF THE DRAWINGS

Preferred embodiments of the invention will now be described, by way of example only, with reference to the accompanying drawings, in which.

DETAILED DESCRIPTION OF THE PREFERRED EMBODIMENTS

Figure 1:
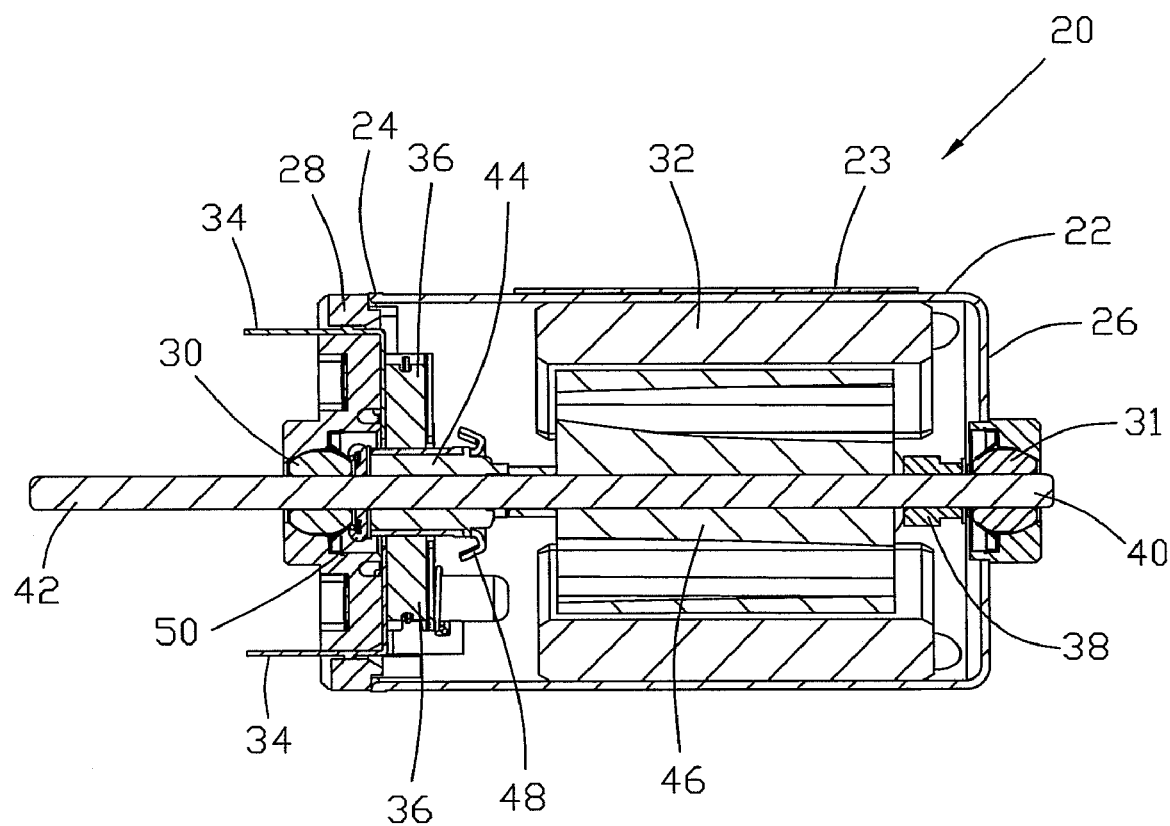
FIG. 1 is a section view of a subfractional horsepower PMDC motor according to a preferred embodiment of the present invention.

FIG. 1 illustrates, in section, a fractional or subfractional horsepower PMDC (permanent magnet direct current) electric motor 20. Such motors are also referred to as miniature, subminiature or micro DC motors. Such motors are common and many are found, for example, driving apparatus within the modern vehicle. Some of these applications involve very low speed and/or very low angular displacements such as certain electronic throttle control motors and flap actuators for ventilation and air-conditioning systems and some may operate in very hot environments such as within the engine compartment of a vehicle.

The motor shown has a deep drawn housing 22 having one open end 24 and one closed end 26. The open end 24 is closed by an end cap 28. The closed end 26 and the end cap 28 support bearings 31, 30 in the form of oil impregnated sintered bushings. The bushings are typically sintered bronze but may be iron or brass. The bearings shown are self aligning bushings but fixed sleeve bushings may be used. A flux ring 23 is fitted to the outside of the housing 22.

The housing 22 supports a pair of arcuate permanent magnets 32 forming the stator of the motor. The end cap 28 also supports a pair of motor terminals 34 and brush gear in the form of two cage brush assemblies 36. The cages are shown being integrally formed with respective motor terminals 34. The rotor 40 of the motor has a shaft 42 rotatably supported by the bearings 30, 31. A commutator 44 and rotor core 46 are mounted on the shaft 42. Windings (not shown) are wound about poles of the rotor core 46 and terminated or connected to terminals 48 of segments of the commutator 44.

An oil stopper 50 is fitted to the shaft 42 between the commutator 44 and the bearing 30 of the end cap 28. The oil stopper 50 is adapted to contact the axial end of the bearing 30 as a thrust bearing. The contact may be direct contact or through intermediate washers to reduce friction and contact noise. As the shaft 42 is able to slide axially through the bearings 30, 31, a spacer 38, fitted to the shaft 42 at the other side of the rotor core 46, bears against the bearing 31 of the closed end 26 of the housing. Thus, axial movement of the shaft 42 through the two bearings 30, 31 is limited by the oil stopper 50 and the spacer 38. This movement is known as end play. For certain applications, the amount of end play must be tightly controlled and thus, the positioning of the spacer 38 is important.

This arrangement allows very close positioning of the commutator 44 to the end cap 28 as normally, extra space or axial distance is required for fitting of an oil stopper to prevent contact between the bearing and the oil stopper.

Figure 2:
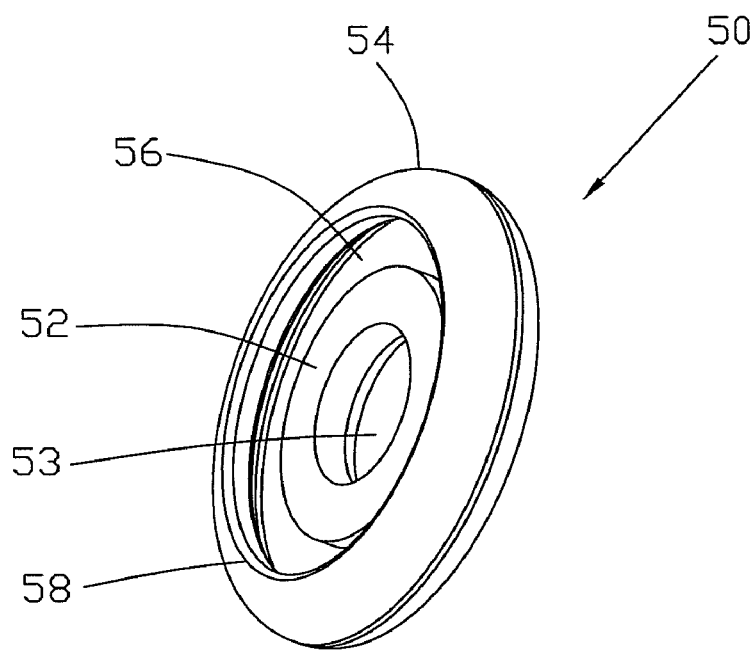
FIG. 2 is a perspective view of an oil stopper, being a part of the motor of FIG. 1.
Figure 3:
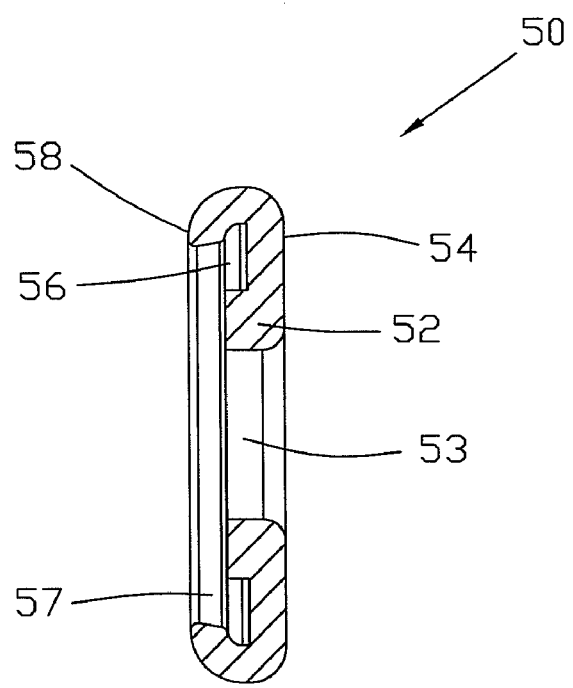
FIG. 3 is a sectional view of the oil stopper of FIG. 2.

The oil stopper 50, as more clearly shown in FIGS. 2 and 3, has a body portion 52 and an oil collecting portion 54 for collecting migrating oil. It should be realized by the reader that the amount of oil which migrates along the shaft from the bearing is a very small percentage of the total oil in the bearing. Also, to withstand high temperature environments, the oil collector is made of a high temperature material, preferably a metal, such as brass, aluminum and steel.

The body portion 52 is adapted to be a press fit on the shaft 42 and is required to resist movement under expected axial loading under severe conditions. This gives an oil tight connection between the oil stopper 50 and the shaft 42, preventing migration of oil along the shaft. The body portion 52 is also adapted to make contact with an end face of the bearing 30, either directly or through intermediary washers designed to reduce the friction therebetween. Thus the bearing 30 and oil stopper 50 provide a thrust bearing.

The body portion 52 is cylindrical with a central through hole 53. The oil collecting portion 54 extends radially from the body portion 54 and forms an annular cavity 56 with an opening 57 on the axial side facing the bearing 30.

The preferred oil stopper 50, as shown in FIGS. 2 and 3, has a lip 58 extending radially inward from the radially outer edge of the opening 57. This lip 58, which is optionally formed by rolling the radially outer edge of the opening 57, serves to retain oil within the cavity 56 during operation of the motor as well as during periods of rest.

As shown in FIG. 1, the side of the oil stopper 50 facing away from the bearing 30, i.e., facing the commutator 44 is flat. It is adapted to bear against the axial end of the commutator 44, either directly or through intermediate washers. This provides a solid backing for the oil stopper 50 allowing it to be pressed against the bearing 30 without fear of axial displacement.

It is preferred that the opening 57 of the cavity 56 is larger than the axial end face of the bushing 30 and that the lip 58 is disposed axially displaced towards the bearing 30 compared with the face of the body portion 52 so as to capture any oil flung out by the interface between the bearing 30 and the body portion 52.

Figure 4:
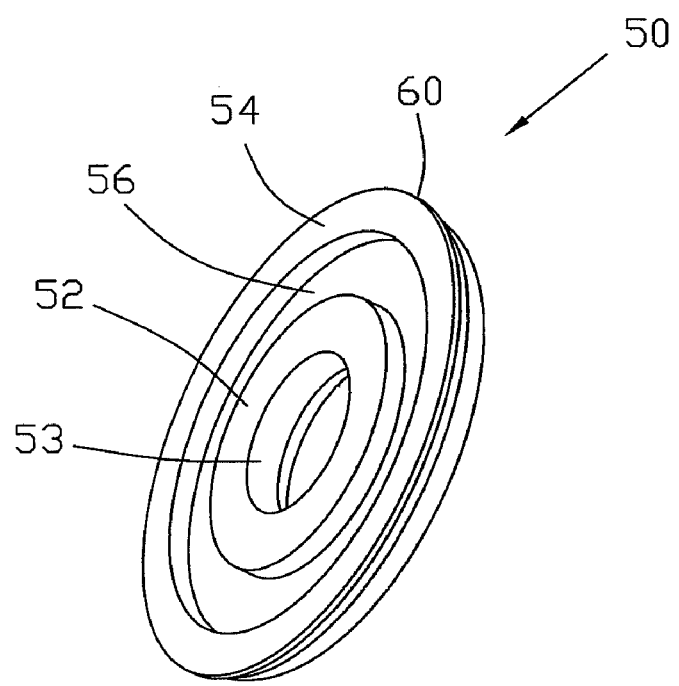
FIG. 4 is a perspective view of an alternative oil stopper.
Figure 5:
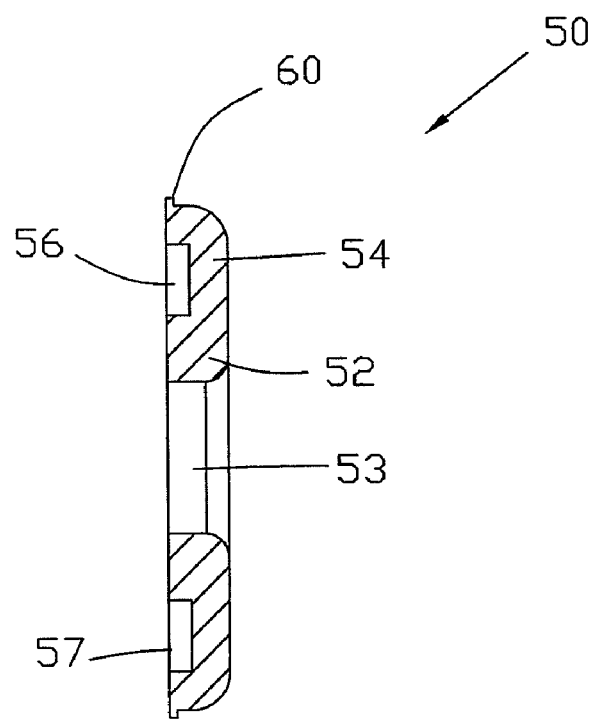
FIG. 5 is a sectional view of the oil stopper of FIG. 4.

FIGS. 4 and 5 illustrate an alternate oil stopper. This oil stopper 50 is constructed similarly to the oil stopper of FIG. 2 except there is no lip and the opening 57 is axially flush with the face of the body portion 52. In addition, there is a small radial protrusion forming a circumferential ridge 60 on the radially outer surface. This ridge 60 forms a slinger to fling oil migrating to the top of the oil stopper, radially away from the shaft 42 and thus away from the commutator 44. This design has the advantage of being easier to manufacture, e.g. by a simple stamping operation, while giving satisfactory performance in some applications such as when the shaft is mounted vertically, in either orientation, i.e. commutator pointing up or pointing down.

Figure 6:
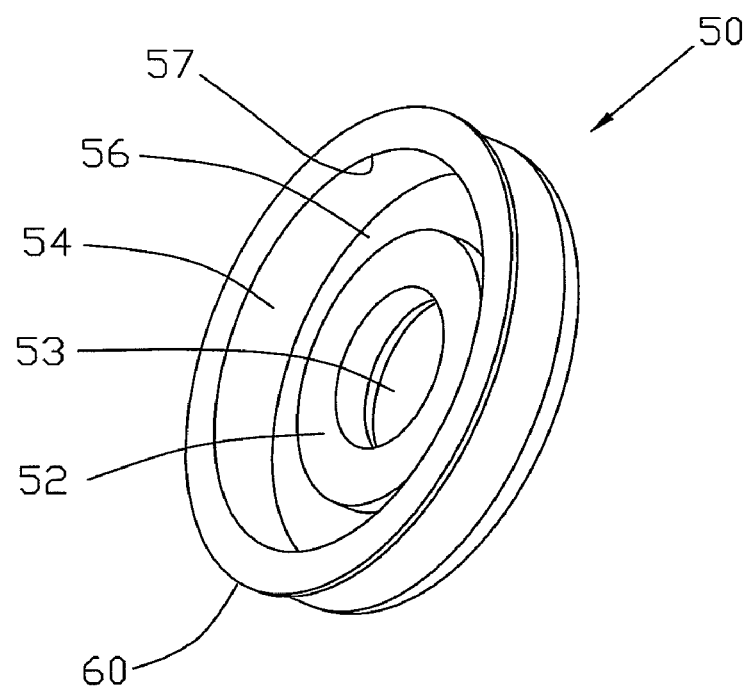
FIG. 6 is a perspective view of another alternative oil stopper.
Figure 7:
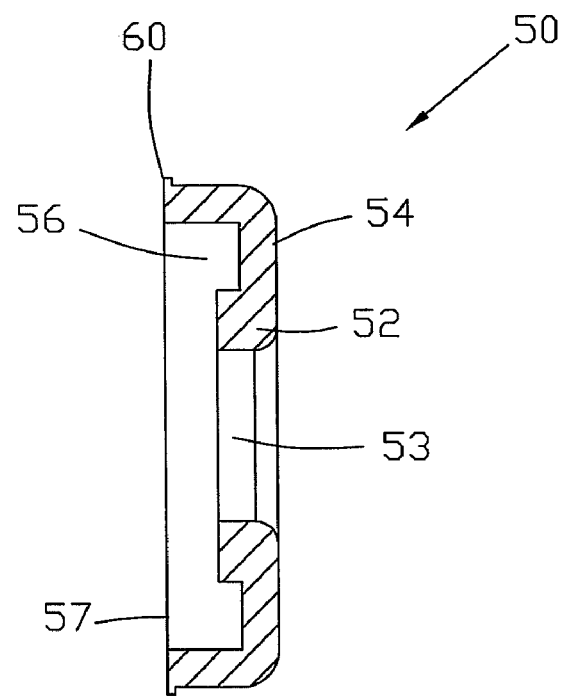
FIG. 7 is a sectional view of the slinger of FIG. 6.

The oil stopper 50 of FIGS. 6 and 7 is similar to the oil stopper of FIGS. 4 and 5 with the exception that the outer edge of the cavity 56 of the oil collecting portion 54 is axially longer than the body portion 52 so as to enclose the bearing/oil stopper interface.

Figure 8:
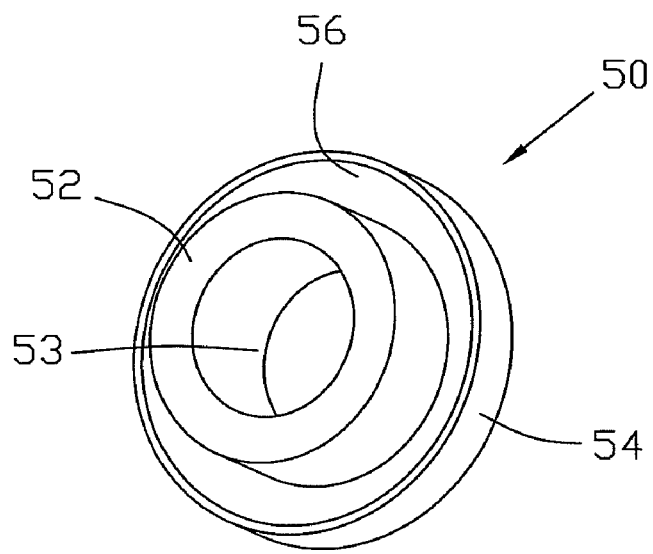
FIG. 8 is a perspective view of yet another alternative slinger.
Figure 9:
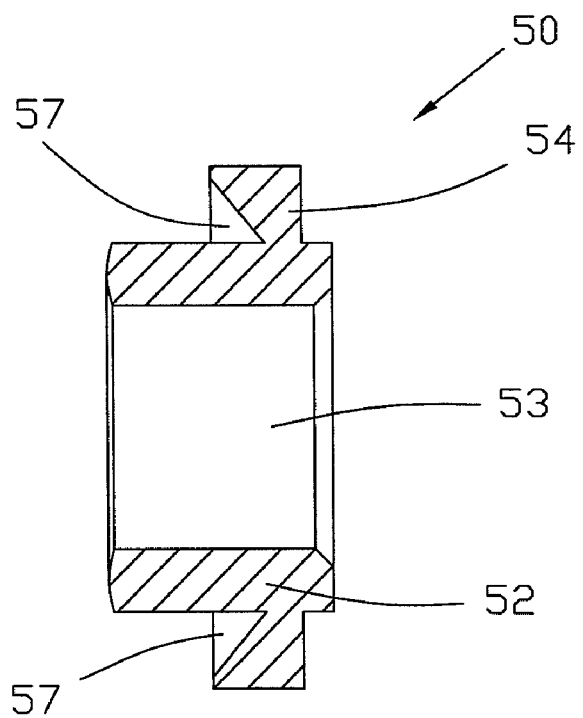
FIG. 9 is a sectional view of the slinger of FIG. 8.

FIGS. 8 and 9 illustrate a further alternate embodiment of the oil stopper 50. In this embodiment the body portion 52 is larger than in the previous embodiments. The oil collecting portion 54 extends radially out from the body portion 52 and the annular cavity 56 is formed with a triangular cross-section such that the cavity 56 is axially deepest close to the body portion 52 and tapers off towards the radially outer edge of the oil collecting portion 54. This shape has advantages for forging, stamping, turning and sintering fabrication methods while other profiles such as square and half round are also readily able to be turned or sintered.

The larger body portion 52, measured in the axial direction, allows the oil stopper 50 to be more firmly attached to the shaft 42 by a press fit which means that the oil stopper 50 can be used to replace the normal spacer. This is particularly useful when low end play is required as the oil stopper/spacer can reduce the need for a separate spacer and allow some space between the commutator 44 and the oil stopper 50 for end play adjustment.

While the oil stopper 50 has been shown in the preferred embodiment being used in motors with bearings of the oil impregnated sintered bushing type, it can also be used with motors having bearings of the ball or roller type. These bearings do not allow the shaft to move axially through the bearing and so the feature of the spacer is not required. These types of bearings also have problems with oil migration especially in very hot applications even with bearing seals but as mentioned before the amount of oil migrating is very small and thus the size of the cavity in the oil collecting portion can appear to be very small.

Figure 10:
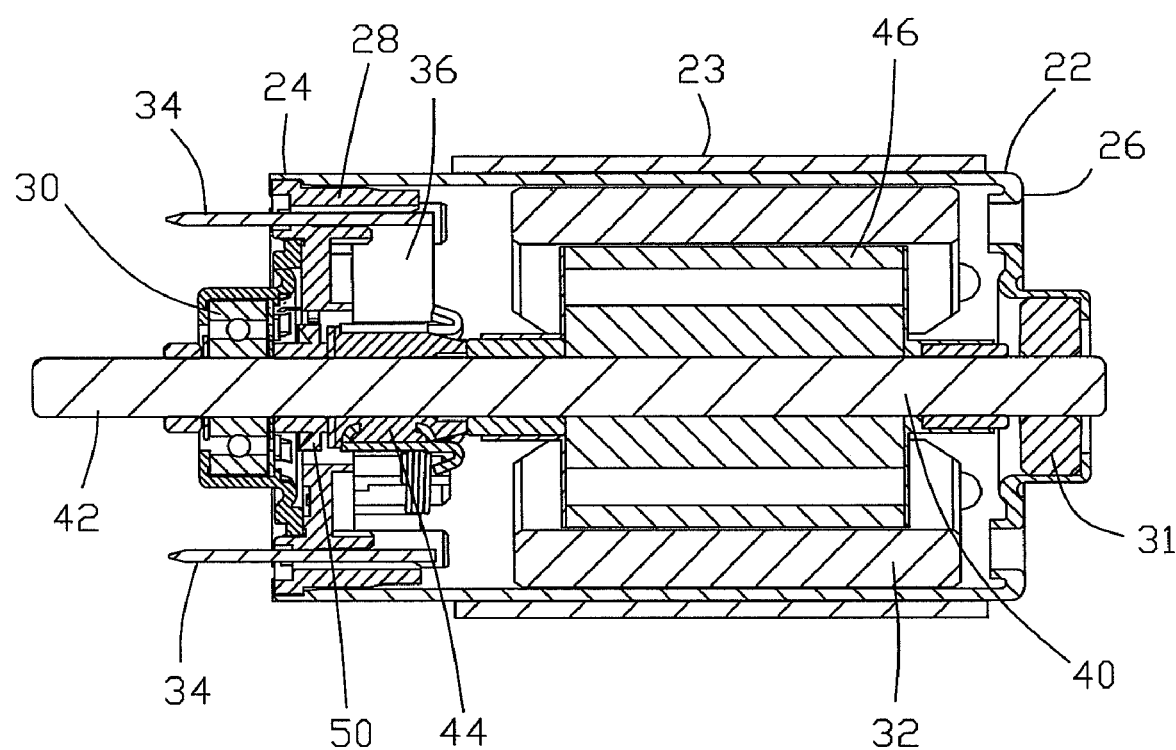
FIG. 10 is a section view of a subfractional horsepower PMDC motor, similar to the motor of FIG. 1 incorporating the slinger of FIG. 8.

FIG. 10 illustrates the oil stopper 50 of FIG. 8 fitted within a PMDC motor using a ball bearing 30 on the commutator end and a sleeve bushing 31 on the other end of the shaft 42. In this illustration, the oil stopper 50 is also functioning to space the commutator 44 a predetermined distance from the bearing 30 so as to correctly align the brushes mounted on the inside of the end cap 28 with the commutator 44.

Although the invention has been described with reference to a preferred embodiment, it should be appreciated by those in the art that various modifications are possible within the scope of the invention. Therefore, the scope of the invention is to be determined by reference to the claims that follow.

The invention claimed is:

1. An electric motor comprising:
    a wound rotor having a shaft, a rotor core, a commutator and windings wound about the rotor core and connected to the commutator;
    a stator confronting the rotor;
    brush gear connecting the commutator to motor terminals;
    first and second bearings for rotatably supporting the rotor, and;
    an oil stopper fitted to the shaft between the commutator and the first bearing for preventing oil migrating along the shaft from the first bearing reaching the commutator;
    wherein the oil stopper has a body portion for fixedly mounting to the shaft and an oil collecting portion and is of high temperature material;
    wherein the oil collecting portion of the oil stopper extends radially outwardly from the body portion and has an annular cavity with an opening facing towards the first bearing, where the opening is spaced from the shaft and the diameter of the outer edge of the opening is greater than a diameter of a radially outer surface of the bearing.

2. The electric motor of claim 1, wherein the oil stopper is of metal.

3. The electric motor of claim 1, wherein the oil stopper is fixed to the shaft by an oil tight press fit.

4. The electric motor of claim 1, wherein the body portion of the oil stopper makes direct contact with an axial face of the first bearing.

5. The electric motor of claim 1, wherein the body portion of the oil stopper functions as a spacer and is fixed fast to the shaft to limit movement of the shaft through the first bearing in a first direction.

6. The electric motor of claim 1, wherein the annular cavity has a radially inwardly extending lip on the radially outer edge of the opening.

7. The electric motor of claim 6, wherein the inner diameter of the lip is greater than a diameter of a radially outer surface of the bearing.

8. The electric motor of claim 1, wherein the first bearing is an oil impregnated sintered bushing.

\* \* \* \* \*